(12) United States Patent
Stearns

(10) Patent No.: US 10,275,831 B2
(45) Date of Patent: Apr. 30, 2019

(54) SYSTEM IMPLEMENTING SMART BETA FACTOR DEPOSITION BASED ON ASSETS IN EXISTING PORTFOLIO

(71) Applicant: BANK OF AMERICA CORPORATION, Charlotte, NC (US)

(72) Inventor: Steven K. Stearns, Fairfield, CT (US)

(73) Assignee: Bank of America Corporation, Charlotte, NC (US)

( * ) Notice: Subject to any disclaimer, the term of this patent is extended or adjusted under 35 U.S.C. 154(b) by 615 days.

(21) Appl. No.: 14/744,381

(22) Filed: Jun. 19, 2015

(65) Prior Publication Data

US 2016/0371779 A1    Dec. 22, 2016

(51) Int. Cl.
  *G06Q 40/06*   (2012.01)
(52) U.S. Cl.
  CPC .................................. *G06Q 40/06* (2013.01)
(58) Field of Classification Search
  CPC ....................................................... G06Q 40/00
  See application file for complete search history.

(56) References Cited

U.S. PATENT DOCUMENTS

| | | | | |
|---|---|---|---|---|
| 7,949,591 B2* | 5/2011 | McGarel | ............... | G06Q 40/00 705/35 |
| 2015/0221039 A1* | 8/2015 | Johansson | .............. | G06Q 40/06 705/36 R |
| 2016/0110811 A1* | 4/2016 | Siu | ........................ | G06Q 40/06 705/36 R |
| 2016/0343078 A1* | 11/2016 | Vaidyanathan | ........ | G06Q 40/06 |

* cited by examiner

*Primary Examiner* — Scott S Trotter
(74) *Attorney, Agent, or Firm* — Michael A. Springs; Moore & Van Allen PLLC; Peter B. Stewart

(57) ABSTRACT

Disclosed is a system implementing smart beta factor deposition based on assets in an existing portfolio. The system typically includes a processor, a memory, and a module stored in the memory. The module is typically configured to: retrieve factor data for one or more securities associated with an existing portfolio; determine a score for beta factor models for the securities; receive threshold conditions associated with the existing portfolio; defining a plurality of factor sleeves for an investment portfolio; for each factor sleeve's beta factor model, determine a score of each of a plurality of securities; select one or more securities based on the score of each security according to the factor sleeve's beta factor model and the score of each of the securities in the existing portfolio until the factor sleeve's size has been reached; and combine the positions of each factor sleeve to create the investment portfolio.

17 Claims, 3 Drawing Sheets

SYSTEM IMPLEMENTING SMART BETA FACTOR DEPOSITION BASED ON ASSETS IN EXISTING PORTFOLIO

FIELD OF THE INVENTION

The present invention embraces a smart beta factor deposition system for constructing an investment portfolio based on assets in an existing portfolio. The smart beta factor deposition system typically includes a processor, a memory, and a module stored in the memory to utilize securities from an existing portfolio to build a new investment portfolio based on the smart beta factor deposition system.

BACKGROUND

Traditionally, an investor has had to choose between an actively managed portfolio in which investments are actively selected to seek a return that outperforms of the market and a passively-managed portfolio in which investments mirror one or more standard market indexes based on market capitalization. Recently, a third investment style, smart beta investing has become more popular. Smart beta investing combines aspects of active and passive portfolio management. Instead of seeking to mirror a standard market index, smart beta investing employs a strategy based on one or more factors in an effort to seek a return and/or reduce volatility in comparison with standard market indexes. For example, a smart beta strategy might weight or screen a standard market index based on one or more factors, such as cash flow, dividends, or volatility. Once the rules for the strategy have been defined, these rules are passively followed. That said, a need exists for an improved way of utilizing smart beta strategies.

SUMMARY

In one aspect, the present invention embraces a smart beta factor deposition system and implementing the smart beta factor deposition based on assets in an existing portfolio and an associated method and computer program product. The smart beta factor deposition system typically includes a non-transitory computer-readable storage medium and at least one computer processor. The smart beta factor deposition system also typically includes a deposition module stored in the memory and executable by the computer processor.

In one embodiment, the deposition module includes computer-executable instructions for causing the computer processor to be configured to: retrieve factor data for one or more securities associated with an existing portfolio from a network of distributed servers, wherein the factor data is associated with one or more beta factor models; determine a score for the one or more beta factor models for each of the one or more securities associated with the existing portfolio based on at least the factor data; receive one or more threshold conditions associated with the existing portfolio, wherein the threshold conditions are associated with the score of the one or more beta factor models associated with the one or more securities in the existing portfolio; determine an investment opportunity set associated with a plurality of customer accounts, the investment opportunity set comprising a plurality of securities; define a plurality of factor sleeves for an investment portfolio, each factor sleeve defining (i) a beta factor model, (ii) one or more asset classes and/or asset class categories, (iii) a size, and (iv) one or more position sizes; for each factor sleeve's beta factor model, determine a score of each of the plurality of securities in the investment opportunity set; for each factor sleeve, select one or more securities based on the score of each security according to the factor sleeve's beta factor model and the score of each of the one or more securities in the existing portfolio until the factor sleeve's size has been reached, each selected security being associated with the factor sleeve's one or more asset classes and/or asset class categories, each selected security forming a position having a size equal to one of the factor sleeve's position sizes; and combine the positions of each factor sleeve to create the investment portfolio, wherein: (i) the size of the plurality of factor sleeves is based on a size of the one or more securities from the existing portfolio satisfying at least one of the one or more threshold conditions; or (ii) selecting one or more securities is further based on the scores of the one or more securities from the existing portfolio satisfying at least one of the one or more threshold conditions.

In some embodiments, the module comprises computer-executable instructions for causing the computer processor to continuously retrieve updated factor data for each of the plurality of securities in the investment opportunity set; and continuously update the score for one or more beta factor models associated with each of the plurality of securities in the investment portfolio based on at least continuously retrieving updated factor data In some embodiments, the module comprises computer-executable instructions for causing the computer processor to: determine one or more securities in the existing portfolio that do not satisfy at least one of the one or more threshold conditions; initiate execution of a first transaction of the one or more securities that do not satisfy at least one of the one or more threshold conditions, wherein initiating the first transaction further comprises: selling the one or more securities; and receiving funds associated with the one or more securities based on at least selling the one or more securities; and initiate execution of a second transaction with the funds received from execution of the first transaction, wherein initiating the second transaction further comprises buying one or more securities for the investment portfolio using funds received from the execution of the first transaction.

In some embodiments, the module comprises computer-executable instructions for causing the computer processor to: determine that the one or more securities purchased using the funds received from the execution of the first transaction do not cause the investment portfolio to be under concentrated or over concentrated.

In some embodiments, each factor sleeve defines a rebalancing schedule; and the module comprises computer-executable instructions for causing the computer processor to: regularly update the score of each of the plurality of securities in the investment opportunity set for each factor sleeve's beta factor model; update the positions of each factor sleeve based on each factor sleeve's rebalancing schedule; and based on updating the positions of at least one factor sleeve, conduct one or more securities transactions in the investment portfolio.

In some embodiments, the module comprises computer-executable instructions for causing the computer processor to: determine the size of the one or more securities from the existing portfolio that satisfy at least one of the one or more threshold conditions; and update the size of at least one of the plurality of factor sleeves based on at least difference between the size of at least one of the plurality of factor sleeves in the investment portfolio and the size of the one or more securities from the existing portfolio.

In some embodiments, the module further comprises computer-executable instructions for causing the computer processor to: display on a graphical user interface on a user device, the scores for the one or more beta factor models associated with each of the one or more securities associated with the existing portfolio.

In another aspect, a computer program product for scoring an existing portfolio using smart beta factor deposition and utilizing the score to build an investment portfolio is presented. The computer program product comprises a non-transitory computer-readable storage medium having computer-executable instructions for causing a computer processor to be configured to: retrieve factor data for one or more securities associated with an existing portfolio from a network of distributed servers, wherein the factor data is associated with one or more beta factor models; determine a score for the one or more beta factor models for each of the one or more securities associated with the existing portfolio based on at least the factor data; receive one or more threshold conditions associated with the existing portfolio, wherein the threshold conditions are associated with the score of the one or more beta factor models associated with the one or more securities in the existing portfolio; determine an investment opportunity set associated with a plurality of customer accounts, the investment opportunity set comprising a plurality of securities; define a plurality of factor sleeves for an investment portfolio, each factor sleeve defining (i) a beta factor model, (ii) one or more asset classes and/or asset class categories, (iii) a size, and (iv) one or more position sizes; for each factor sleeve's beta factor model, determine a score of each of the plurality of securities in the investment opportunity set; for each factor sleeve, select one or more securities based on the score of each security according to the factor sleeve's beta factor model and the score of each of the one or more securities in the existing portfolio until the factor sleeve's size has been reached, each selected security being associated with the factor sleeve's one or more asset classes and/or asset class categories, each selected security forming a position having a size equal to one of the factor sleeve's position sizes; and combine the positions of each factor sleeve to create the investment portfolio, wherein: (i) the size of the plurality of factor sleeves is based on a size of the one or more securities from the existing portfolio satisfying at least one of the one or more threshold conditions; or (ii) selecting one or more securities is further based on the scores of the one or more securities from the existing portfolio satisfying at least one of the one or more threshold conditions.

In yet another aspect, a computerized method for scoring an existing portfolio using smart beta factor deposition and utilizing the score to build an investment portfolio is presented. The method comprises: retrieving factor data for one or more securities associated with an existing portfolio from a network of distributed servers, wherein the factor data is associated with one or more beta factor models; determining a score for the one or more beta factor models for each of the one or more securities associated with the existing portfolio based on at least the factor data; receive one or more threshold conditions associated with the existing portfolio, wherein the threshold conditions are associated with the score of the one or more beta factor models associated with the one or more securities in the existing portfolio; defining a plurality of factor sleeves for an investment portfolio, each factor sleeve defining (i) a beta factor model, (ii) one or more asset classes and/or asset class categories, (iii) a size, and (iv) one or more position sizes; for each factor sleeve's beta factor model, determining a score of each of a plurality of securities; for each factor sleeve, selecting one or more securities based on the score of each security according to the factor sleeve's beta factor model and the score of each of the one or more securities in the existing portfolio until the factor sleeve's size has been reached, each selected security being associated with the factor sleeve's one or more asset classes and/or asset class categories, each selected security forming a position having a size equal to one of the factor sleeve's position sizes; and combining the positions of each factor sleeve to create the investment portfolio, wherein: (i) the size of the plurality of factor sleeves is based on a size of the one or more securities from the existing portfolio satisfying at least one of the one or more threshold conditions; or (ii) selecting one or more securities is further based on the scores of the one or more securities from the existing portfolio satisfying at least one of the one or more threshold conditions.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
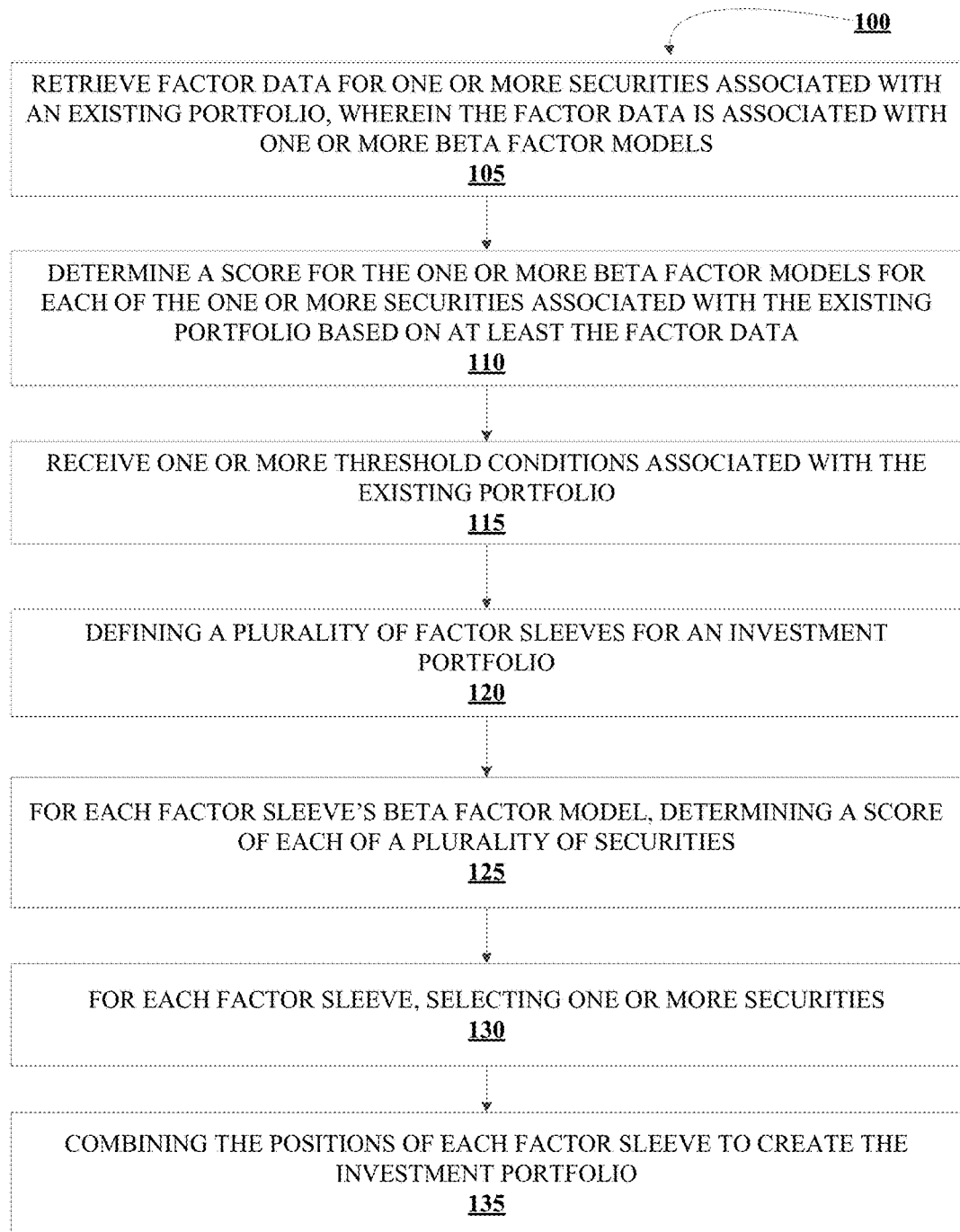

Having thus described embodiments of the invention in general terms, reference will now be made the accompanying drawings, wherein:

FIG. 1 illustrates a high level process flow for implementing smart beta factor deposition based on assets in existing portfolio in accordance with an aspect of the present invention.

Figure 2:
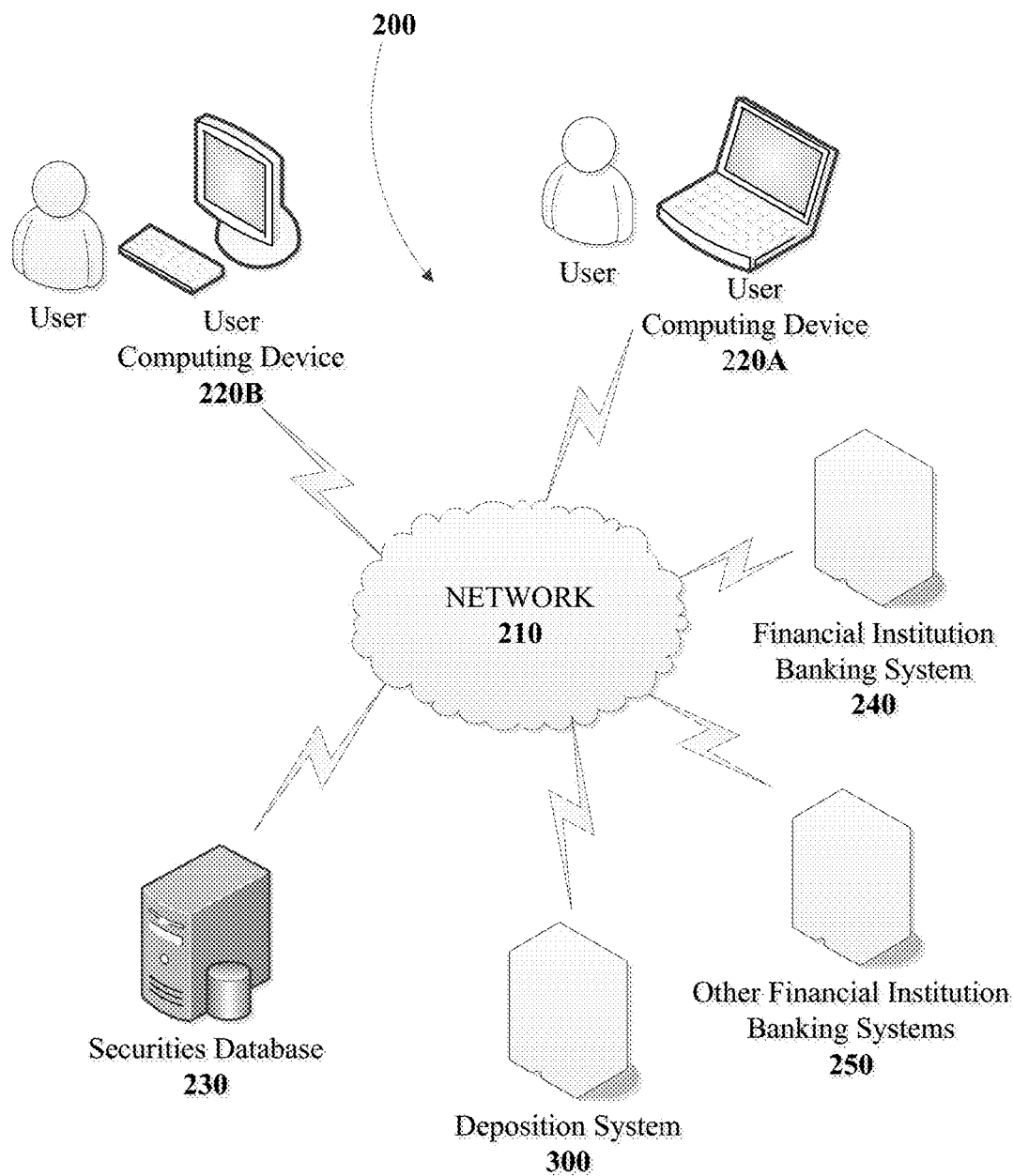
Figure 3:
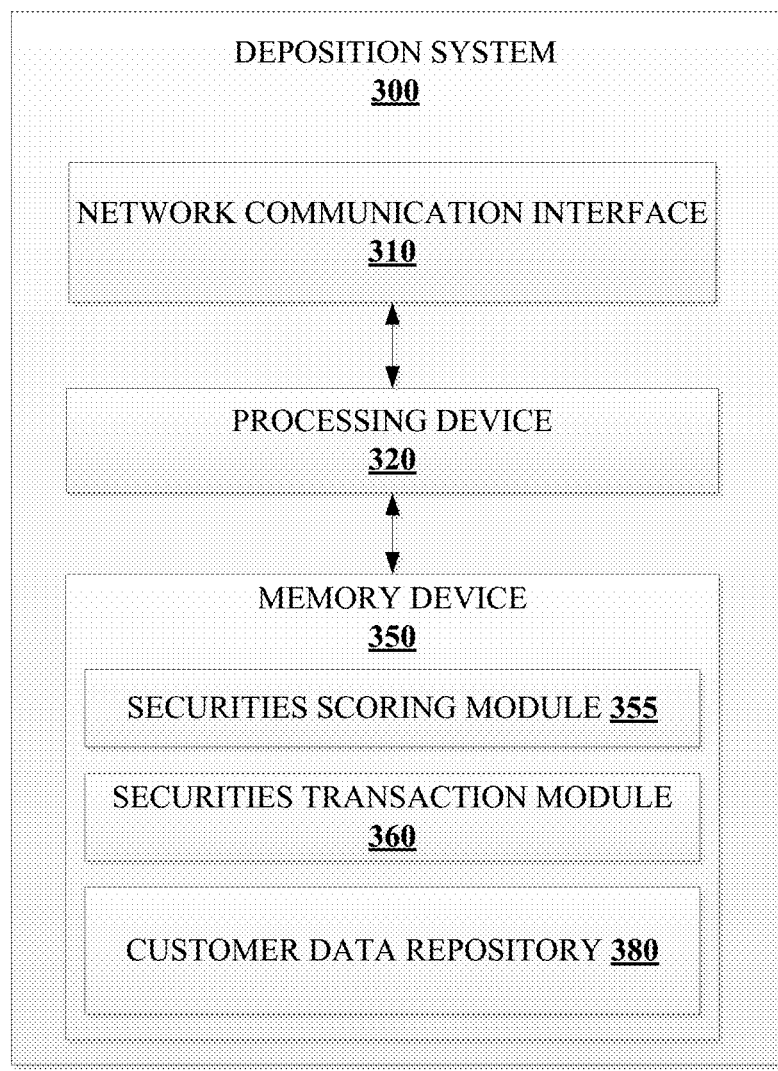

FIG. 2 depicts a deposition system and operating environment in accordance with an aspect of the present invention; and FIG. 3 schematically depicts a deposition system in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, an insurance account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

In some embodiments, the "user" may be a customer (e.g., an account holder or a person who has an account (e.g., banking account, credit account, brokerage account or the like) at the entity) or potential customer (e.g., a person who has submitted an application for an account, a person who is the target of marketing materials that are distributed by the entity, a person who applies for a loan that not yet been funded). In other embodiments, the "user" may refer to an employee of the entity.

In one aspect, the present invention utilizes a smart beta factor deposition system for creating an investment portfolio by selecting securities (e.g., stocks, bonds, mutual funds, exchange traded funds, real estate investment trusts, and the like) having the highest scores according to different beta factor models. As used herein, securities include insurance separate accounts, which are accounts maintained by insurance companies in which a customer having certain insurance products (e.g., variable annuity or variable universal life) can invest, and which are synonymous to mutual funds in which a customer can invest in a retirement account. After the highest scoring securities have been selected, an investor can then purchase securities that correspond to the selection of securities that make up the created investment portfolio. By selecting securities based on different beta factor models an investment portfolio can be efficiently created without the need to employ the complex correlation models required by mean variance optimization. Although such complex correlation models generally are not employed by the present system, the present system is able to construct diversified portfolios with desirable risk and return. In addition, because many of the beta factor models employed by the present system do not rely on historical data to the same extent that such data is used in mean variance optimization, the present system is more able to adapt to changing market conditions.

Accordingly, FIG. 1 illustrates a process flow for implementing smart beta factor deposition based on assets in existing portfolio 100, in accordance with embodiments of the invention. Typically, an existing portfolio may include a collection of securities held by an investment company, hedge fund, financial institution, or individual. For purposes of this invention, an existing portfolio may refer to a collection of securities held by the user. In some embodiments, the existing portfolio may include a grouping of financial assets such as stocks, bonds and cash equivalents, as well as their mutual, exchange-traded, and closed-fund counterparts. In some embodiments, an existing portfolio is a collection of securities previously held by the user and is independent of the investment portfolio created using the smart beta factor deposition system as described herein. As shown in block 105, the process flow includes retrieving factor data for one or more securities associated with an existing portfolio from a network of distributed servers, wherein the factor data is associated with one or more smart beta factor models. This factor data typically includes financial data, financial ratios, and/or other metrics regarding each security. By way of example, such factor data may include various metrics such as price, earnings, cash flow, market capitalization, volatility, price to earnings, price to book value, dividend yield, and the like. In some instances, such factor data may include rankings, projections, and/or recommendations from analysts. Typically, the factor data for each security includes a score or data related to one or more smart beta factors. Such beta factors may include value, momentum, quality, capital stewardship (e.g., yield or growth), and/or trend strength. Factor data related to the value beta factor may include: intrinsic value, relative value, price to book, price to earnings, price to cash flow, price to sales, and projected total return. Factor data related to the momentum beta factor may include: trailing total return, composite price momentum, and analyst revision momentum. Factor data related to the quality beta factor may include: return on capital, return on equity, earnings quality, and beta. Factor data related to the capital stewardship beta factor may include: shareholder yield, dividend year, buyback yield, dividend growth, historical dividend growth, projected dividend growth, dividend quality, and projected earnings growth. Factor data related to the trend strength beta factor may include various technical indicators. In some embodiments, the factor data may be retrieved from one or more factor databases, which may be maintained by the financial institution or by a third party data provider. Because some of the metrics (e.g., the market price of assets) may be constantly changing, such factor databases may be constantly updated (e.g., in real time), and, accordingly, updated factor data may be continuously retrieved from such factor databases. In other embodiments, the deposition system for creating the investment portfolio may be in communication with one or more factor data feeds, which may be provided by the financial institution or by a third party data provider. Such factor feeds may provide live (e.g., real time) factor data.

In some embodiments, at least some of the securities may relate to alternative investments. One of the problems associated with scoring funds and other securities having alternative investments in accordance with each beta factor model is that asset allocations of securities having alternative investments are generally not publically available. Accordingly, although some factor data regarding each security having alternative investments can be retrieved, other factor data (e.g., projected returns) cannot be readily retrieved or calculated. Therefore, if certain factor data is unavailable, such unavailable factor data may be replaced with factor data derived from the projected constituent makeup of securities employing the same or similar type of alternative strategy. In other words, the projected constituent makeup of a type of alternative strategy may function as a substitute asset allocation if the actual asset allocation of a security employing a similar alternative strategy. For example, certain third party data providers may project the constituent makeup of securities that employ certain alternative strategies. The projected constituent makeup of the closest alternative strategy may then be retrieved and used as a substitute for unavailable factor data for a particular security having alternative investments.

Next, the process flow includes determining a score for the one or more smart beta factor models for each of the one or more securities associated with the existing portfolio based on at least the factor data, as shown in block 110. In one aspect, the existing portfolio may not be created using the smart beta factor deposition system. In this regard, the customer typically has one or more accounts, such as investment, retirement, or brokerage accounts, through which securities may be purchased. The customer's accounts may be maintained by the financial institution that provides the deposition system and/or by other financial institutions. In some embodiments, the score for the one or more smart beta factor models for each of the one or more securities associated with the existing portfolio may be determined based on a multi-factor model.

Each smart beta factor model typically incorporates one or more beta factors to evaluate the efficacy of investing in one or more securities. For example, a smart beta factor model may be (i) a short term (e.g., 0-6 month investment time horizon) model, (ii) an intermediate term (e.g., 6-24 month investment time horizon) model, a (iii) a long term (e.g., 1-5 year investment time horizon) model, or the like. Such models may also incorporate any fees or transaction costs (e.g., to take into the account the bid-offer spread for a security) associated with the one or more securities. In some embodiments, the models are static (i.e., do not change). That said, in other embodiments, the smart beta factor model might be dynamically altered based on changing conditions and/or customized based on user preferences.

In some embodiments, each smart beta factor model may be associated with a rebalancing frequency to determine the most recent score associated with the one or more smart beta factor models. Typically, the existing portfolio's asset allocation may be a key determinant of the existing portfolio's risk and return characteristics. Yet, over time, asset classes may produce different returns resulting in a likely drift of the existing portfolio. In this regard, rebalancing the smart beta factor models for each security will enable the system to determine the most recent scores associated with the one or more smart beta factor models. In one aspect, rebalancing strategies may incur any fees or transaction costs. In some embodiments, the frequency associated with the rebalancing of the one or more smart beta factor models may vary. In some other embodiments, the frequency associated with the rebalancing of the one or more smart beta factor models may be the same.

As shown in block 115, the process flow includes receiving one or more threshold conditions associated with the existing portfolio, wherein the threshold conditions are associated with the score of the one or more smart beta factor models associated with the one or more securities in the existing portfolio. The threshold conditions may also be based on other data such as factor data, transaction cost information, total gain, and other information. In this regard, the threshold conditions may be customizable by the customer and may be configured to be variable at any time by the customer with proper authentication credentials. In some other embodiments, the threshold conditions may be established based on one or more characteristics (e.g., trading activity level, transaction costs, or the like) of the customer. By way of example, the customer may prefer that each of the one or more securities in the existing portfolio have a score for quality and capital to be greater than 45. In this case, the customer may request that when the score for quality and capital of any of the securities decreases below 45, the system may be configured to trigger an alert. In this regard, the triggered alert may be associated with a particular security in the existing portfolio. In one aspect, if the customer has previously held multiple existing portfolios, the triggered alert may be associated with each security in the existing portfolio and the existing portfolio associated with each security that has satisfied the threshold condition. In some embodiments, the one or more threshold conditions may be positive. In this regard, the one or more threshold conditions may be established to determine whether the score of a security in the existing portfolio is indicative of the security's favorable performance.

In one aspect, transaction costs may be related to threshold conditions. These transaction costs may include fees or any other costs incurred by the customer due to buying or selling an asset (e.g. security). In this regard, the system may be configured to establish one or more threshold conditions in such a way that the each threshold condition may enable the customer to minimize the transaction cost associated with trading the asset. In some embodiments, the threshold conditions may be based on a trading spread associated with the asset allocation.

Next, in block 120, the process flow includes defining a plurality of factor sleeves for an investment portfolio. In some embodiments, building the investment portfolio includes defining a plurality of factor sleeves, typically within the smart beta factor deposition system. Each factor sleeve includes a plurality of parameters that are employed to build a subset of the customer's investment portfolio. In this regard, each factor sleeve typically defines (i) a beta factor model that is used to score a plurality of securities, (ii) one or more asset classes and/or asset class categories from which top scoring securities are selected, (iii) a size, and (iv) one or more position sizes.

The top scoring securities are selected from the asset classes and/or asset class categories defined for each factor sleeve. Securities may be broadly grouped into different asset classes, such as equities (e.g., stocks), fixed income (e.g., bonds), real and alternative assets (e.g., real estate and commodities), and cash, in which securities in the same asset class typically have similar characteristics. Securities within the same asset class may be more narrowly grouped into different asset class categories, such as securities that relate to the same country, region, size (e.g., small, medium, or large), style (e.g., value or growth), or sector (e.g., staples, healthcare, telecomm, utilities, financials, technology, industrial, materials, and the like). Real and alternative assets may be divided between growth-oriented (higher volatility) real and alternative assets (e.g., real estate, infrastructure, natural resources, energy, commodities, higher volatility alternative investments, and precious metals) and income-oriented (low volatility) real and alternative assets (e.g., treasury inflation-protected securities, floating rate bonds, non-traditional bonds, lower volatility alternative investments, and currency). Alternative securities may be ETFs, mutual funds, or insurance separate accounts that seek to replicate alternative strategies often employed by hedge funds. Some factor sleeves may be applicable to multiple asset classes or asset class categories. That said, other factor sleeve may be applicable to a single asset class or asset class category. Indeed, in some instances a particular beta factor model may only be applicable to a particular asset class. By way of example, top scoring equities and fixed income investments (e.g., bonds) may be selected under a first factor sleeve, top scoring fixed income investments may be selected under a second factor sleeve, and top scoring US equities may be selected under a third factor sleeve.

Each factor sleeve typically defines one or more position sizes. Each position size relates the size of each position (i.e., security selected for inclusion in the investment portfolio) selected under each factor sleeve. For example, if the portfolio has a total size of $100,000 and each factor sleeve has a size of $20,000, each position size may be 4% of the total portfolio or $4,000. Thus, in this example, each selected security would have a size of $4,000. In some embodiments, each factor sleeve may define multiple position sizes, where the size of each position is based on the liquidity of the underlying security. In this regard, some securities may have lower levels of trading activity that may make it more difficult to liquidate (e.g., sell) such securities quickly. Accordingly, smaller position sizes may be employed for securities with lower liquidity. For example, each factor sleeve may define a position size of 4% for highly liquid securities, 2% for securities with medium liquidity, and 1% for securities with low liquidity.

Each factor sleeve may also define a rebalancing schedule. The rebalancing schedule for each factor sleeve is based on the factor sleeve's beta factor model and specifies the frequency at which the positioned selected under a factor sleeve should be updated. For example, shorter term beta factor models may require weekly or monthly rebalancing, intermediate term beta factor models may require monthly or quarterly rebalancing, and longer term beta factor models may require quarterly or annual rebalancing.

Because the customer may have multiple accounts for investing, each factor sleeve may also define a particular account of the customer. In other words, each factor sleeve may be assigned to a particular customer account. In some instances, similar factor sleeves (e.g., factor sleeves having the same beta factor model and asset classes and/or asset class categories) may be assigned to different customer accounts. Where each sleeve is assigned to a particular customer account, the size of each sleeve may reflect a dollar value and/or a percent of the assigned customer account.

In combination, the factor sleeves are used to build the investment portfolio. Various factor sleeves may be selected based on the customer's desired risk and return. In particular, the asset classes/asset class categories and sizes of the factor sleeves may be selected or adjusted based on the customer's desired risk and return. For example, a customer seeking higher risks and returns may employ more or larger sleeves specific to equities and fewer or smaller sleeves specific to fixed income investments, and a customer seeking lower risks and returns may employ fewer or smaller sleeves specific to equities and more or larger sleeves specific to fixed income investments. In some embodiments, at least a portion of the investment portfolio may be built from a sleeve that does not employ a beta factor model. For example, a portion (e.g., 10%) of the investment portfolio may be built from mutual funds or exchange traded funds that reflect a market-capitalization-weighted standard index (e.g., a market-capitalization-weighted standard stock market index).

An exemplary set of factor sleeves used to build an investment portfolio is depicted in Table 1 (below). The primary beta factors for each sleeve are the beta factor(s) that primarily make up each sleeve's beta factor model. Those sleeves listed without beta factors are used to select securities that reflect standard market indexes.

TABLE 1

| Sleeve Name | Primary Beta Factors | Asset Classes/Asset Class Categories | Size | Position Sizes | Rebalancing Schedule |
|---|---|---|---|---|---|
| Dynamic1 | Momentum | Equities | 4% | 4% (high liquidity) 2% (medium liquidity) 1% (low liquidity) | Monthly |
| Dynamic2 | Momentum | Fixed Income | 4% | 4% (high liquidity) 2% (medium liquidity) 1% (low liquidity) | Monthly |
| Dynamic3 | Momentum | All | 8% | 4% (high liquidity) 2% (medium liquidity) 1% (low liquidity) | Monthly |
| Tactical1 | Value Momentum | Equities | 4% | 4% (high liquidity) 2% (medium liquidity) 1% (low liquidity) | Quarterly |
| Tactical2 | Value Momentum | Fixed Income | 4% | 4% (high liquidity) 2% (medium liquidity) 1% (low liquidity) | Quarterly |
| Tactical3 | Value Momentum | Growth Real Assets | 8% | 4% (high liquidity) 2% (medium liquidity) 1% (low liquidity) | Quarterly |
| Tactical4 | Value Momentum | Income Real Assets | 4% | 4% (high liquidity) 2% (medium liquidity) 1% (low liquidity) | Quarterly |
| Tactical5 | Value Momentum | All | 8% | 4% (high liquidity) 2% (medium liquidity) 1% (low liquidity) | Quarterly |
| Strategic1 | Value | Equities | 8% | 4% (high liquidity) 2% (medium liquidity) 1% (low liquidity) | Annually |
| Strategic2 | Value | Fixed Income | 4% | 4% (high liquidity) 2% (medium liquidity) 1% (low liquidity) | Annually |
| Income | Shareholder Yield | Equities | 8% | 4% (high liquidity) 2% (medium liquidity) 1% (low liquidity) | Annually |
| Core | Quality Value | Equities | 8% | 4% (high liquidity) 2% (medium liquidity) 1% (low liquidity) | Annually |
| Base1 | N.A. | US Equities | 4% | 4% (high liquidity) 2% (medium liquidity) 1% (low liquidity) | Annually |
| Base2 | N.A. | Int'l Equities | 4% | 4% (high liquidity) 2% (medium liquidity) 1% (low liquidity) | Annually |

TABLE 1-continued

| Sleeve Name | Primary Beta Factors | Asset Classes/Asset Class Categories | Size | Position Sizes | Rebalancing Schedule |
|---|---|---|---|---|---|
| Base3 | N.A. | US Fixed Income | 4% | 4% (high liquidity) 2% (medium liquidity) 1% (low liquidity) | Annually |
| Base4 | N.A. | Int'l Fixed Income | 4% | 4% (high liquidity) 2% (medium liquidity) 1% (low liquidity) | Annually |
| Base5 | N.A. | Growth Real Assets | 4% | 4% (high liquidity) 2% (medium liquidity) 1% (low liquidity) | Annually |
| Base6 | N.A. | Income Real Assets | 4% | 4% (high liquidity) 2% (medium liquidity) 1% (low liquidity) | Annually |
| Base7 | N.A. | Cash | 4% | N.A. | Annually |

In some embodiments, one or more asset class and/or asset class category limits may be defined. Such asset class and/or asset class category limits define the maximum amount of the investment portfolio that may be made up of securities that fall within such asset class and/or asset class category. For example, an asset class limit may define that the investment portfolio shall include no more than 20% fixed income investments. Typically, once such a limit has been reached, no additional securities will be selected if such securities fall within the limited asset class and/or asset class category. In other words, once such a limit has been reached, any additional securities that would cause the limit to be exceeded should not be selected.

At block 125, a score for each of a plurality of securities is determined based on each factor sleeve's beta factor model. In particular, for each factor sleeve, securities that fall within the factor sleeve's asset classes/asset class categories are scored in accordance with the factor sleeve's beta factor model. In this regard, factor data regarding the securities is retrieved. This factor data typically includes financial data, financial ratios, and/or other metrics regarding each security. By way of example, such factor data may include various metrics such as price, earnings, cash flow, market capitalization, volatility, price to earnings, price to book value, dividend yield, and the like. In some instances, such factor data may include rankings, projections, and/or recommendations from analysts. Typically, the factor data for each security includes a score or data related to one or more smart beta factors. Such beta factors may include value, momentum, quality, capital stewardship (e.g., yield or growth), and/or trend strength. Factor data related to the value beta factor may include: intrinsic value, relative value, price to book, price to earnings, price to cash flow, price to sales, and projected total return. Factor data related to the momentum beta factor may include: trailing total return, composite price momentum, and analyst revision momentum. Factor data related to the quality beta factor may include: return on capital, return on equity, earnings quality, and beta. Factor data related to the capital stewardship beta factor may include: shareholder yield, dividend year, buyback yield, dividend growth, historical dividend growth, projected dividend growth, dividend quality, and projected earnings growth. Factor data related to the trend strength beta factor may include various technical indicators. In some embodiments, the factor data may be retrieved from one or more factor databases, which may be maintained by the financial institution or by a third party data provider. Because some of the metrics (e.g., the market price of assets) may be constantly changing, such factor databases may be constantly updated (e.g., in real time), and, accordingly, updated factor data may be continuously retrieved from such factor databases. In other embodiments, the deposition system for creating the investment portfolio may be in communication with one or more factor data feeds, which may be provided by the financial institution or by a third party data provider. Such factor feeds may provide live (e.g., real time) factor data.

In some instances, the asset allocation of a security may be unavailable. Accordingly, if the actual asset allocation of a security is unavailable, a substitute asset allocation may be identified and used instead. In this regard, at least some of the securities may be mutual funds or insurance separate accounts. One of the problems associated with scoring mutual funds and insurance separate accounts in accordance with each beta factor model is that asset allocations of mutual funds and insurance separate accounts are generally not publically available. Accordingly, although some factor data regarding each mutual fund and insurance separate accounts can be retrieved, other factor data (e.g., projected returns) cannot be readily retrieved or calculated. Therefore, if certain factor data is unavailable, such unavailable factor data may be replaced with factor data from the constituents of the closest corresponding market index, which have publically available asset allocations. In other words, the asset allocation of the market index may function as a substitute asset allocation if the actual asset allocation of a security is unavailable. For example, the projected total return of a U.S. large cap equities mutual fund may be determined by identifying the closest corresponding U.S. large cap equities index and using data regarding the index's constituents, as well as any fees associated with the mutual fund, to determine the projected total return.

Next, at block 130, the process flow includes selecting one or more securities based on the score of each security according to the factor sleeve's beta factor model until the factor sleeve's size has been reached, each selected security being associated with the factor sleeve's one or more asset classes and/or asset class categories, each selected security forming a position having a size equal to one of the factor sleeve's position sizes. For example, if a particular factor sleeve has a size of 20% and defines a position size of 4%, then the five securities with the highest scores according to the factor sleeve's beta factor model may be selected to form positions.

In some embodiments, one or more accounts of the customer may have a limited number of securities in which the customer can invest using such accounts. For example, a particular retirement account may only have thirty different securities in which the customer can invest. Accordingly, before selecting the top scoring securities, the securities available for investment (i.e., the investment opportunity set) in the customer's account may be determined. Thereafter, the top scoring securities are selected from the securities available for investing in the investment portfolio. If different customer accounts have differing investment opportunity sets, top scoring securities may be separately selected for each account. To facilitate separate selection of securities for each account, each factor sleeve may be assigned to a particular customer account.

As noted, in some embodiments, a factor sleeve may define multiple position sizes, where the size of each position is based on the liquidity of the underlying security. Accordingly, the liquidity of each selected security may be determined (e.g., based on received liquidity data). Based on this liquidity, the position size of each selected security may be determined. By way of example, a factor sleeve may define a position size of 4% for highly liquid securities, 2% for securities with medium liquidity, and 1% for securities with low liquidity. Accordingly, the number of securities selected for this factor sleeve may vary depending on the liquidity of the highest scoring securities. For example, the five securities with the highest scores according to the factor sleeve's beta factor model may be selected to form positions if each of the five securities has high liquidity. That said, the six highest scoring securities may be selected if four of the six securities have high liquidity, and the remaining two securities have medium liquidity. In addition, the seven highest scoring securities may be selected if four of the seven securities have high liquidity, one of the securities has medium liquidity, and the remaining two securities have low liquidity.

In some embodiments, once a security has been selected under one factor sleeve, that same security will not be selected under any other factor sleeve. For example, if a particular factor sleeve has a size of 20% and defines a position size of 4%, then the five securities with the highest scores according to the factor sleeve's beta factor model would ordinarily be selected to form positions. That said, if the fifth highest scoring security has already been selected under another factor sleeve, then the fifth highest security would not be selected, but would be replaced with the sixth highest scoring security, assuming the sixth highest scoring security has not been selected under another factor sleeve. If the sixth highest scoring security has been selected under another factor sleeve, then the security with the highest score and not already selected under another factor sleeve would be selected. That said, in other embodiments, the same security may be selected under multiple factor sleeves.

If one or more asset class and/or asset class category limits have been defined, once such a limit has been reached, no additional securities will be selected if such securities fall within the limited asset class and/or asset class category. For example, if a particular factor sleeve has a size of 20% and defines a position size of 4%, then the five securities with the highest scores according to the factor sleeve's beta factor model would ordinarily be selected to form positions. That said, if selecting the fifth highest scoring security would result in an asset class or asset class category limit being exceed, then the fifth highest security would not be selected, but would be replaced with the sixth highest scoring security, assuming the sixth highest scoring security does not fall within the limited asset class or asset class category.

In some embodiments, selecting one or more securities may be based on the scores of the one or more securities from the existing portfolio satisfying at least one of the one or more threshold conditions. In this regard, the one or more threshold conditions associated with the scores of the one or more smart beta factor models of the one or more securities may indicate that the one or more securities from the existing portfolio are performing favorably with respect to the one or more smart beta factor models. In doing so, the one or more securities in the existing portfolio that satisfy at least one of the one or more threshold conditions may be retained in the existing portfolio. In some embodiments, the one or more securities selected in a factor sleeve may be based further on the size of the one or more securities in the existing portfolio that have triggered one or more threshold conditions. In this regard, the one or more threshold conditions may be associated with a favorable performance of the one or more securities. By way of example, consider each position size in a momentum factor sleeve of the investment portfolio is valued at $5,000 with the size of the momentum factor sleeve being $20,000. The existing portfolio includes one or more securities with a size of $10,000 that have triggered the one or more threshold conditions associated with favorable momentum performance. In this case, the one or more securities selected to form positions in the momentum factor sleeve in the investment portfolio may include the one or more securities in the existing portfolio with a size of $10,000 that meet the relevant threshold conditions to form two positions and two securities with the highest scores according to the momentum factor sleeve's beta factor model to form the remaining two positions. Typically, where selecting one or more securities for a factor sleeve is based on the scores of the one or more securities from the existing portfolio satisfying at least one of the one or more threshold conditions, rather than selecting new securities to form one or more positions within a factor sleeve, securities within the existing portfolio satisfying a relevant threshold condition (e.g., a threshold condition based at least in part on the same or a similar beta factor model as the beta factor model associated with the factor sleeve) may be used to fill one or more positions based on the size of such positions and the size of the securities in the existing portfolio satisfying the relevant threshold condition. If these existing securities do not have sufficient size to fill all of the positions associated with the factor sleeve, new securities may be used form the remaining positions. By selecting the securities within a factor sleeve based on securities in the existing portfolio satisfying a relevant threshold condition, the system may be configured to ensure that all of the investments of a customer are not over concentrated or under concentrated with respect to any particular beta factor model. That said, if no relevant threshold condition is triggered for a particular factor sleeve, then selecting securities for that sleeve is typically not based on the securities within the existing portfolio.

In some embodiments, the size of the plurality of factor sleeves in the investment portfolio may be based on a size of the one or more securities from the existing portfolio satisfying at least one of the one or more threshold conditions. In this regard, the system may be configured to determine the size of the one or more securities from the existing portfolio that satisfy the one or more threshold conditions, to create the investment portfolio. By way of example, if the initial size of a factor sleeve for the investment portfolio is $20,000 and the size of the one or more securities from the existing portfolio satisfying a relevant threshold condition (e.g., a threshold condition based at least in part on the same or a similar beta factor model as the beta factor model associated with the factor sleeve) is $10,000, the size of the factor sleeve is updated to reflect a difference between the factor sleeve in the investment portfolio and the size of the one or more securities from the existing portfolio (i.e., $10,000) satisfying a relevant threshold condition. By adjusting the size of a factor sleeve based on securities in the existing portfolio satisfying a relevant threshold condition, the system may be configured to ensure that all of the investments of a customer are not over concentrated or under concentrated with respect to any particular beta factor model. That said, if no relevant threshold condition is triggered for a particular factor sleeve, then the size of such factor sleeve is typically not adjusted.

At block 135, the positions selected for each factor sleeve are combined to create the investment portfolio. Information regarding the investment profile may then be presented to the customer and/or to an employee (e.g., an investment advisor) of the financial institution who is assisting the customer. Based on the positions in the created investment portfolio, securities transactions may be conducted (e.g., securities are purchased) in one of more accounts of the customer to build an actual portfolio that corresponds to the created investment portfolio. If sleeves are assigned to particular customer accounts, such transactions are performed based on such assignment. For example, for a first position selected under a first sleeve assigned to a first customer account, a corresponding transaction is performed in the first customer account, and, for a second position selected under a second sleeve assigned to a second customer account, a corresponding transaction is performed in the second customer account. The securities in the existing portfolio that do not satisfy at least one of the one or more threshold conditions may be transacted (e.g., sold, gifted, or the like). In some embodiments, the funds received from transacting the one or more securities in the existing portfolio that do not satisfy at least one of the one or more threshold conditions may be used to build an actual portfolio that corresponds to the created investment portfolio.

Subsequently, the positions selected under each factor sleeve typically are updated based on the each sleeve's defined rebalancing schedule. In one aspect, each factor sleeve may be updated based on the one or more threshold conditions associated with the existing portfolio being triggered. As noted, different factor sleeves and/or different portfolios may have different rebalancing schedules. In this regard, the scores of the securities in the investment portfolio are updated based on each factor sleeve's beta factor model and the top scoring securities are selected. If there are any changes to the top scoring securities, the positions in the investment portfolio are updated and, if necessary, securities transactions are conducted (e.g., securities may be bought and sold) to insure that the securities held in the customer's account(s) reflect the updated positions. Further, the positions in the investment portfolio may be updated based on changes to the threshold conditions and/or the one or more securities in the existing portfolio.

In some instances, the positions selected under different factor sleeves may change without requiring securities transactions to be conducted. For example, a particular security may initially be selected under a first factor sleeve. Subsequently, during a rebalancing the security is found to no longer be a top scoring security under the first factor sleeve, but is a top scoring security under the second factor sleeve. Accordingly, it may not be necessary to buy or sell any positions with respect to this security.

As noted, in some instances the customer may have multiple accounts into which securities may be purchased. For example, the customer may have one or more retirement accounts, which may have limitations on the customer's ability to deposit, withdrawn, or transfer funds, and one or more brokerage accounts. The costs associated with these accounts may vary. For example, some accounts may charge annual fees (e.g., annual fees of either a flat amount or a percentage of the value of the account), but might not charge transaction-based fees. That said, other accounts might charge transaction-based fees and/or have other transaction-based costs. Such transaction-based costs may result in undesirably high costs when the customer engages in a higher volume of transactions. However, certain factor sleeves may define a rebalancing schedule that requires frequent (e.g., weekly or monthly) rebalancing, thereby resulting in higher transaction volumes associated with such factor sleeves. Accordingly, in another aspect, the present invention embraces a deposition system for creating an investment portfolio that attempts to reduce the effects of the transaction costs associated with the customer's accounts. These transaction costs may include fees or any other costs incurred by the customer due to buying or selling a security in a particular account. Other costs (e.g., annual fees) associated with the customers' accounts are also typically determined. In some instances, an account may impose a limit on the frequency in which securities may be traded. Accordingly, in some embodiments, any transaction frequency limits for the customer's accounts may be determined.

FIG. 2 depicts an operating environment 200 according to one embodiment of the present invention. The operating environment 200 includes a deposition system 300 for creating an investment portfolio that selects securities having the highest scores according to different beta factor models. In addition, one or more users, each having a user computing device 220, such as a PC, laptop, mobile phone, tablet, television, mobile device, or the like, may be in communication with the deposition system 300 via a network 210, such as the Internet, wide area network, local area network, Bluetooth network, near field network, or any other form of contact or contactless network. Typically, each user is an employee of the financial institution. That said, the user may be a customer. The deposition system 200 is typically in communication with one or more securities databases 230 via the network 210. The deposition system 300 may regularly (e.g., daily, weekly, monthly, or quarterly) retrieve information regarding securities from the securities database 230 in order to score the securities based on different beta factor models. For example, the deposition system 300 may continuously (e.g., every few seconds or minutes) retrieve factor data from the securities database 230 (e.g., receive data from the securities database 230 via a data stream), thereby allowing the deposition system 300 to continuously update the scores of securities (e.g., in real time). Other information regarding securities (e.g., the asset allocation of one or more ETFs) may also be retrieved from the securities database 230. In order for the deposition system 300 to facilitate securities transactions in customer accounts, the deposition system 300 is typically in communication (e.g., via the network 210) with the banking system 240 of the financial institution. In addition, the deposition system 300 is typically in communication with the banking systems 250 of other financial institutions, thereby allowing the deposition system 300 to direct securities transactions in accounts maintained by such other financial institutions.

FIG. 3 depicts the deposition system 300 in more detail. As depicted in FIG. 3 the deposition system 300 typically includes various features such as a network communication interface 310, a processing device 320, and a memory device 350. The network communication interface 310 includes a device that allows the deposition system 300 to communicate over the network 210 (shown in FIG. 2) with the user computing devices 220. In this regard, the deposition system may graphically present (e.g., communicate over the network 210) an interface (e.g., a graphical user interface) to each computing device, which can then be displayed on each user computing device to allow each user to interact with the deposition system 300. For example, the user may interact with the deposition system 300 to select (e.g., select from predefined factor sleeves) or define factor sleeves for a particular customer based on the customer's desired rate of return and risk tolerance. The user may also define asset class and/or asset class category limits.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 350, generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

As noted, the deposition system 300 is configured to score securities according to one or more smart beta factor models and use these scores to select the highest scoring securities for inclusion in a customer's investment portfolio. Accordingly, the deposition system 300 typically includes a securities scoring module 355 stored in the memory device 350, which scores securities and selects the highest scoring securities to create investment portfolios. A securities transaction module 360 may communicate with the banking system 240 of the financial institution and the banking systems 250 of other financial institutions to direct securities transactions in customer accounts (e.g., by transmitting buying and selling instructions). The deposition system 300 also typically includes a customer data repository 380. The customer data repository 380 includes data regarding each customer, such as: information regarding each customer's accounts, including any associated costs (e.g., transaction costs); the factor sleeves applicable to each customer; and any defined asset class and/or asset class category limits.

To supplement the present disclosure, this application further incorporates entirely by reference the following commonly assigned patent applications:

| U.S. patent application Ser. No. | Title | Filed On |
|---|---|---|
| 14/463,343 | SMART BETA FACTOR DEPOSITION SYSTEM | Aug. 19, 2014 |
| 14/463,378 | SMART BETA FACTOR DEPOSITION BASED ON ACCOUNT TRANSACTION COSTS | Aug. 19, 2014 |
| 14/685,127 | COMPUTERIZED SYSTEM FOR EFFICIENTLY IDENTIFYING INVESTMENT OPPORTUNITIES FOR NON-MANAGED INVESTMENT ACCOUNTS | Apr. 13, 2015 |

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for scoring an existing portfolio using smart beta factor deposition and utilizing the score to build an investment portfolio, the system comprising:
   a non-transitory computer-readable storage medium;
   at least one computer processor; and
   a module stored in the memory non-transitory computer-readable storage medium and executable by the computer processor, the module comprising computer-executable instructions for causing the computer processor to:
   automatically continuously retrieve factor data, in real-time for one or more securities associated with an existing portfolio from a network of distributed servers, wherein the factor data is associated with one or more beta factor models, wherein the network of distributed servers comprises real-time factor data associated with real-time changes in market conditions;
   determine a score for the one or more beta factor models for each of the one or more securities associated with the existing portfolio based on at least the real-time factor data;
   receive one or more threshold conditions associated with the existing portfolio, wherein the one or more threshold conditions are associated with the score of the one or more beta factor models associated with the one or more securities in the existing portfolio;
   continuously monitor the one or more securities in the existing portfolio based on at least the real-time factor data;
   in response to monitoring the one or more securities in the existing portfolio, determine that the one or more securities in the existing portfolio satisfy at least one of the one or more threshold conditions;
   trigger an alert and transmit control signals to display the alert on a user device via a graphical user interface based on determining that the one or more securities in the existing portfolio satisfy at least one of the one or more threshold conditions;
   in response to transmitting the alert, receive one or more instructions from the user device via the graphical user interface, where the one or more instructions are associated with the one or more securities in the existing portfolio satisfying at least one of the one or more threshold conditions;
   determine an investment opportunity set associated with a plurality of customer accounts, the investment opportunity set comprising a plurality of securities;
   define a plurality of factor sleeves for an investment portfolio, each factor sleeve defining (i) a beta factor model, (ii) one or more asset classes and/or asset class categories, (iii) a size, and (iv) one or more position sizes;
   for each factor sleeve's beta factor model, automatically continuously retrieve, from the network of distributed servers, updated factor data in real-time for each of the plurality of securities in the investment opportunity set;
   for each factor sleeve's beta factor model, determine a score of each of the plurality of securities in the investment opportunity set based on the retrieved real-time updated factor data for each of the plurality of securities;

for each factor sleeve, select high scoring one or more securities based on the score of each security according to the factor sleeve's beta factor model and the score of each of the one or more securities in the existing portfolio until the factor sleeve's size has been reached, each selected security being associated with the factor sleeve's one or more asset classes and/or asset class categories, each selected security forming a position having a size equal to one of the factor sleeve's position sizes;

combine the positions of each factor sleeve to create the investment portfolio, wherein:
(i) the size of the plurality of factor sleeves is based on a size of the one or more securities from the existing portfolio satisfying at least one of the one or more threshold conditions; or
(ii) selecting the high scoring one or more securities is further based on the scores of the one or more securities from the existing portfolio satisfying at least one of the one or more threshold conditions and the one or more instructions received from the user device;

in response to creating the investment portfolio, display information associated with the investment portfolio on the graphical user interface; and automatically continuously update the score of one or more beta factor models associated with each of the plurality of securities in the investment opportunity set and the score of one or more beta factor models associated with each of the one or more securities in the existing portfolio.

2. The system of claim 1, wherein the module comprises computer-executable instructions for causing the computer processor to:
determine a first set of one or more securities in the existing portfolio that do not satisfy at least one of the one or more threshold conditions;
initiate execution of a first transaction of the first set of one or more securities that do not satisfy at least one of the one or more threshold conditions, wherein initiating the first transaction further comprises:
selling the first set of one or more securities; and
receiving funds associated with the first set of one or more securities based on at least selling the first set of one or more securities; and
initiate execution of a second transaction with the funds received from execution of the first transaction, wherein initiating the second transaction further comprises buying a second set of one or more securities for the investment portfolio using the funds received from the execution of the first transaction.

3. The system of claim 2, wherein the module comprises computer-executable instructions for causing the computer processor to:
determine that the second set of one or more securities purchased using the funds received from the execution of the first transaction do not cause the investment portfolio to be under concentrated or over concentrated.

4. The system of claim 1, wherein:
each factor sleeve defines a rebalancing schedule; and
the module comprises computer-executable instructions for causing the computer processor to:
update the positions of each factor sleeve based on each factor sleeve's rebalancing schedule; and
based on updating the positions of at least one factor sleeve, conduct one or more securities transactions in the investment portfolio.

5. The system of claim 1, wherein the module comprises computer-executable instructions for causing the computer processor to:
determine the size of the one or more securities from the existing portfolio that satisfy at least one of the one or more threshold conditions; and
update the size of at least one of the plurality of factor sleeves based on at least difference between the size of at least one of the plurality of factor sleeves in the investment portfolio and the size of the one or more securities from the existing portfolio.

6. The system of claim 1, wherein the module further comprises computer-executable instructions for causing the computer processor to:
display on the graphical user interface on the user device, the scores for the one or more beta factor models associated with each of the one or more securities associated with the existing portfolio.

7. A computer program product for scoring an existing portfolio using smart beta factor deposition and utilizing the score to build an investment portfolio, the computer program product comprising a non-transitory computer-readable storage medium having computer-executable instructions for causing a computer processor to be configured to:
automatically continuously retrieve factor data, in real-time for one or more securities associated with an existing portfolio from a network of distributed servers, wherein the factor data is associated with one or more beta factor models, wherein the network of distributed servers comprises real-time factor data associated with real-time changes in market conditions;
determine a score for the one or more beta factor models for each of the one or more securities associated with the existing portfolio based on at least the real-time factor data;
receive one or more threshold conditions associated with the existing portfolio, wherein the one or more threshold conditions are associated with the score of the one or more beta factor models associated with the one or more securities in the existing portfolio; continuously monitor the one or more securities in the existing portfolio based on at least the real-time factor data;
in response to monitoring the one or more securities, determine that the one or more securities satisfy at least one of the one or more threshold conditions;
trigger an alert and transmit control signals to display the alert on a user device via a graphical user interface based on determining that the one or more securities satisfy at least one of the one or more threshold conditions;
in response to transmitting the alert, receive one or more instructions from the user device via the graphical user interface, where the one or more instructions are associated with the one or more securities satisfying the at least one of the one or more threshold conditions;
determine an investment opportunity set associated with a plurality of customer accounts, the investment opportunity set comprising a plurality of securities;
define a plurality of factor sleeves for an investment portfolio, each factor sleeve defining (i) a beta factor model, (ii) one or more asset classes and/or asset class categories, (iii) a size, and (iv) one or more position sizes;

for each factor sleeve's beta factor model, automatically continuously retrieve, from the network of distributed servers, updated factor data in real-time for each of the plurality of securities in the investment opportunity set;

for each factor sleeve's beta factor model, determine a score of each of a plurality of securities in the investment opportunity set based on the retrieved real-time updated factor data for each of the plurality of securities;

for each factor sleeve, select high scoring one or more securities based on the score of each security according to the factor sleeve's beta factor model and the score of each of the one or more securities in the existing portfolio until the factor sleeve's size has been reached, each selected security being associated with the factor sleeve's one or more asset classes and/or asset class categories, each selected security forming a position having a size equal to one of the factor sleeve's position sizes;

combine the positions of each factor sleeve to create the investment portfolio, wherein: (i) the size of the plurality of factor sleeves is based on a size of the one or more securities from the existing portfolio satisfying at least one of the one or more threshold conditions; or (ii) selecting the high scoring one or more securities is further based on the scores of the one or more securities from the existing portfolio satisfying at least one of the one or more threshold conditions and the one or more instructions received from the user device;

in response to creating the investment portfolio, display information associated with the investment portfolio on the graphical user interface; and automatically continuously update the score of one or more beta factor models associated with each of the plurality of securities in the investment opportunity set and the score of one or more beta factor models associated with each of the one or more securities in the existing portfolio.

8. The computer program product of claim 7, wherein the non-transitory computer-readable storage medium having computer-executable instructions for causing a computer processor to be configured to:

determine a first set of one or more securities in the existing portfolio that do not satisfy at least one of the one or more threshold conditions;

initiate execution of a first transaction of the first set of one or more securities that do not satisfy at least one of the one or more threshold conditions, wherein initiating the first transaction further comprises:

selling the first set of one or more securities; and receiving funds associated with the first set of one or more securities based on at least selling the first set of one or more securities; and initiate execution of a second transaction with the funds received from execution of the first transaction, wherein initiating the second transaction further comprises buying a second set of one or more securities for the investment portfolio using the funds received from the execution of the first transaction.

9. The computer program product of claim 8, wherein the non-transitory computer-readable storage medium having computer-executable instructions for causing a computer processor to be configured to:

determine that the second set of one or more securities purchased using the funds received from the execution of the first transaction do not cause the investment portfolio to be under concentrated or over concentrated.

10. The computer program product of claim 7, wherein:

each factor sleeve defines a rebalancing schedule; and the non-transitory computer-readable storage medium having computer-executable instructions for causing a computer processor to be configured for:

updating the positions of each factor sleeve based on each factor sleeve's rebalancing schedule; and based on updating the positions of at least one factor sleeve, conducting one or more securities transactions in the investment portfolio.

11. The computer program product of claim 7, wherein the non-transitory computer-readable storage medium having computer-executable instructions for causing a computer processor to be configured to:

determine the size of the one or more securities from the existing portfolio that satisfy at least one of the one or more threshold conditions; and update the size of each factor sleeve based on at least difference between the size of each of the plurality of factor sleeves in the investment portfolio and the size of the one or more securities from the existing portfolio.

12. The computer program product of claim 7, wherein the non-transitory computer-readable storage medium having computer-executable instructions for causing a computer processor to be configured to:

display on the graphical user interface on the user device, the scores for the one or more beta factor models associated with each of the one or more securities associated with the existing portfolio.

13. A computerized method for scoring an existing portfolio using smart beta factor deposition and utilizing the score to build an investment portfolio, the method comprising:

automatically continuously retrieving factor data, in real-time for one or more securities associated with an existing portfolio from a network of distributed servers, wherein the factor data is associated with one or more beta factor models, wherein the network of distributed servers comprises real-time factor data associated with real-time changes in market conditions;

determining a score for the one or more beta factor models for each of the one or more securities associated with the existing portfolio based on at least the real-time factor data;

receive one or more threshold conditions associated with the existing portfolio, wherein the one or more threshold conditions are associated with the score of the one or more beta factor models associated with the one or more securities in the existing portfolio;

continuously monitoring the one or more securities in the existing portfolio based on at least the real-time factor data;

in response to monitoring the one or more securities, determining that the one or more securities satisfy at least one of the one or more threshold conditions;

triggering an alert and transmitting control signals to display the alert on a user device via a graphical user interface based on determining that the one or more securities satisfy at least one of the one or more threshold conditions;

in response to transmitting the alert, receiving one or more instructions from the user device via the graphical user interface, where the one or more instructions are associated with the one or more securities satisfying at least one of the one or more threshold conditions;

determining an investment opportunity set associated with a plurality of customer accounts, the investment opportunity set comprising a plurality of securities;

defining a plurality of factor sleeves for an investment portfolio, each factor sleeve defining (i) a beta factor model, (ii) one or more asset classes and/or asset class categories, (iii) a size, and (iv) one or more position sizes;

for each factor sleeve's beta factor model, automatically continuously retrieving, from the network of distributed servers, updated factor data in real-time for each of the plurality of securities in the investment opportunity set;

for each factor sleeve's beta factor model, determining a score of each of a plurality of securities in the investment opportunity set based on the retrieved real-time updated factor data for each of the plurality of securities;

for each factor sleeve, selecting high scoring one or more securities based on the score of each security according to the factor sleeve's beta factor model and the score of each of the one or more securities in the existing portfolio until the factor sleeve's size has been reached, each selected security being associated with the factor sleeve's one or more asset classes and/or asset class categories, each selected security forming a position having a size equal to one of the factor sleeve's position sizes;

combining the positions of each factor sleeve to create the investment portfolio, wherein: (i) the size of the plurality of factor sleeves is based on a size of the one or more securities from the existing portfolio satisfying at least one of the one or more threshold conditions; or (ii) selecting the high scoring one or more securities is further based on the scores of the one or more securities from the existing portfolio satisfying at least one of the one or more threshold conditions and the one or more instructions received from the user device;

in response to creating the investment portfolio, displaying information associated with the investment portfolio on the graphical user interface; and automatically continuously updating the score of one or more beta factor models associated with each of the plurality of securities in the investment opportunity set and the score of one or more beta factor models associated with each of the one or more securities in the existing portfolio.

14. The method according to claim 13, comprising:

determining a first set of one or more securities in the existing portfolio that do not satisfy at least one of the one or more threshold conditions;

initiating execution of a first transaction of the first set of one or more securities that do not satisfy at least one of the one or more threshold conditions, wherein initiating the first transaction further comprises:

selling the first set of one or more securities; and receiving funds associated with the first set of one or more securities based on at least selling the first set of one or more securities; and initiating execution of a second transaction with the funds received from execution of the first transaction, wherein initiating the second transaction further comprises buying a second set of one or more securities for the investment portfolio using the funds received from the execution of the first transaction.

15. The method according to claim 14, comprising:

determining that the second set of one or more securities purchased using the funds received from the execution of the first transaction do not cause the investment portfolio to be under concentrated or over concentrated.

16. The method according to claim 13, comprising:

updating the positions of each factor sleeve based on each factor sleeve's rebalancing schedule, wherein the rebalancing schedule is defined for each factor sleeve; and based on updating the positions of at least one factor sleeve, conducting one or more securities transactions in the investment portfolio.

17. The method according to claim 13, comprising:

determining the size of the one or more securities from the existing portfolio that satisfy at least one of the one or more threshold conditions; and updating the size of each factor sleeve based on at least difference between the size of each of the plurality of factor sleeves in the investment portfolio and the size of the one or more securities from the existing portfolio.

* * * * *